(12) United States Patent
Ayers et al.

(10) Patent No.: US 7,018,665 B2
(45) Date of Patent: Mar. 28, 2006

(54) PROCESS FOR SEPARATION OF WHEY PROTEINS USING A NOVEL ANION EXCHANGER

(75) Inventors: John Stephen Ayers, Palmerston North (NZ); David Francis Elgar, Palmerston (NZ); Kay Patricia Palmano, Palmerston North (NZ); Mark Pritchard, Palmerston North (NZ); Ganugapati Bijaya Bhaskar, Palmerston North (NZ)

(73) Assignees: Massey University, (NZ); New Zealand Dairy Board, (NZ)

( * ) Notice: Subject to any disclaimer, the term of this patent is extended or adjusted under 35 U.S.C. 154(b) by 421 days.

(21) Appl. No.: 10/149,339

(22) PCT Filed: Dec. 8, 2000

(86) PCT No.: PCT/NZ00/00245

§ 371 (c)(1),
(2), (4) Date: Nov. 22, 2002

(87) PCT Pub. No.: WO01/41584

PCT Pub. Date: Jun. 14, 2001

(65) Prior Publication Data

US 2003/0125525 A1   Jul. 3, 2003

(30) Foreign Application Priority Data

Dec. 8, 1999 (NZ) .................................... 501644
Jun. 9, 2000 (NZ) .................................... 505071

(51) Int. Cl.
*A23C 21/00* (2006.01)

(52) U.S. Cl. .................. 426/334; 426/478; 426/491; 426/583

(58) Field of Classification Search ................ 426/583, 426/334, 478, 491
See application file for complete search history.

(56) References Cited

U.S. PATENT DOCUMENTS

| 4,175,183 A | 11/1979 | Ayers |
| 4,229,342 A | 10/1980 | Mirabel |
| 5,077,067 A | 12/1991 | Thibault |

FOREIGN PATENT DOCUMENTS

| EP | 0320152 | 6/1989 |
| FR | 2465422 | 3/1981 |
| GB | 1421957 | 1/1976 |
| GB | 1563990 | 4/1980 |
| GB | 2188526 | 10/1987 |

(Continued)

OTHER PUBLICATIONS

Skudder, P. J., (1985) *Evaluation of a Porous Silica-Based Ion-Exchange Medium for the Production of Protein Fractions from Rennet- and Acid- Whey.* Journal of Dairy Research 52, 167-181.

(Continued)

*Primary Examiner*—Helen Pratt
(74) *Attorney, Agent, or Firm*—Knobbe, Martens, Olson & Bear LLP (57) ABSTRACT

The present invention relates to new processes useful for separating whey proteins from whey protein-containing solutions using a novel anion exchanger which comprises a water insoluble, hydrophilic, water swellable, hydroxy ($C_2$–$C_4$) alkylated and cross-linked regenerated cellulose, derivatized with quaternary amino (QA) groups where the level of substitution of the QA groups is 1.4 milli-equivalents per dry gram of anion exchanger (meq/g) or greater.

30 Claims, 2 Drawing Sheets

FOREIGN PATENT DOCUMENTS

| GB | 2251858 | 7/1992 |
|----|---------|--------|
| JP | 4061935 | 2/1992 |
| WO | 95/19714 | 7/1995 |
| WO | 97/26797 | 7/1997 |

OTHER PUBLICATIONS

Outinen, M., et al. (1996) *Chromatographic Fractionation of α-Lactalbumin and β-Lactoglobulin with Polystyrenic Strongly Basic Anion Exchange Resins.* Lebensm.-Wiss. U.—Technol 29, 340-343.

Levison, P. R., (1994) *A Custom Approach to Process-Scale Ion-Exchange Separations.* Chimicaoggi/Chemist. Today, pp. 41-48.

Antal, M., et al. (1992) *Preparation of Microcrystalline Cellulose Aminoderivatives.* Carbohydrate Polymers 19, pp. 167-169.

Ayers, J.S., et al. (1985) *Whey Protein Recovery Using a Range of Novel Ion-Exchangers.* N.Z. J. Dairy Sci. and Technol., 20, pp. 129-142.

Elgar, D.F., et al. (2000) *Simultaneous Separation and Quantitation of the Major Bovine Whey Proteins Including Proteose Peptone and Caseinomacropeptide by Reversed-Phase High-Performance Liquid Chromatography on Polystyrene-Divinylbenzene.* J. Chromatography A. 878, pp. 183-196.

International Search Report from PCT/NZ00/00245 completed Feb. 2, 2001.

PROCESS FOR SEPARATION OF WHEY PROTEINS USING A NOVEL ANION EXCHANGER

CROSS-REFERENCE TO RELATED APPLICATIONS

This is the U.S. National Phase under 35 U.S.C. § 371 of International Application No. PCT/NZ00/00245 filed Dec. 8, 2000 and published in English, which claims priority to New Zealand Application Nos. 501644, filed Dec. 8, 1999 and 505071, filed Jun. 9, 2000, the disclosures of which are herein incorporated by reference in their entireties.

TECHNICAL FIELD

This invention relates to new processes useful for separating whey proteins from whey protein-containing solutions.

BACKGROUND OF THE INVENTION

Anion exchangers have been used to make purified protein products from milk raw materials such as skim milk and whey. They have also been used to modify the properties of milk by the removal of whey proteins from skim milk.

For example GB 1563990 (1980) discloses a method of preparing a mixture of whey proteins (α-lactalbumin, β-lactoglobulin, serum albumin and some immunoglobulin), now known as whey protein isolate (WPI), by passing either skim milk or milk serum (whey) through a column of silica based anion exchanger, washing the column with water and then eluting and recovering the bound protein. Immunoglobulins remaining in the column effluent were recovered by passing this effluent, at the same pH still, through a column of silica which acts as a cation exchanger and adsorbs the immunoglobulins.

EP 0320152 (1989) also discloses a process which contacts an anion exchanger with whey or liquid whey protein concentrate to adsorb most of the whey proteins and form an effluent rich in immunoglobulins. But in EP 0320152 this effluent is treated differently. It is concentrated by ultrafiltration to prepare an immunoglobulin enriched whey protein concentrate powder (WPC).

Both these references refer to the difficulty of performing ion exchange separation of proteins on an industrial scale because many of the known ion exchangers, particularly those based on cellulose and dextran, have weak mechanical properties which do not lend themselves to large scale use. The authors proposed using anion exchangers with better mechanical properties, particularly ones based on silica and coated with cross-linked polymer film containing quaternary ammonium functional groups, such as QMA Spherosil™ (Rhone-Poulenc). Other anion exchangers mentioned specifically were Q Sepharose™ fast flow (Pharmacia), and Q Trisacryl™ (IBF). However all three of these anion exchangers suffer the disadvantage of being expensive which makes it very difficult to recover whey proteins by ion exchange industrially, for economic reasons.

GB 1563990 also discloses a manner of using the anion exchanger to bring about a more selective separation of the whey proteins. This is achieved by passing the milk (or whey) through two columns filled with anion exchanger and used in tandem. The protein recovered from the first column was very rich in β-lactoglobulin while that recovered from the second column contained α-lactalbumin, serum albumin and small quantities of β-lactoglobulin and immunoglobulins. This is a result of β-lactoglobulin binding more tightly to the anion exchanger than the other whey proteins bind. This has been well documented, particularly for this polymer coated silica based anion exchanger QMA Spherosil™. See *J. of Dairy Research*, 52, 167–181, 1985.

WO 97/26797 describes processes similar to the above processes, but the processes described use as feedstock a whey protein containing solution (such as a UF retentate or WPC) having a high protein concentration and reduced ionic strength.

U.S. Pat. No. 5,077,067 (1991) further discloses the use of any strongly basic type anion exchanger for the selective and quantitative removal of β-lactoglobulins from starting materials containing whey proteins. The examples cite the use of anion exchangers manufactured from different matrices; a cross-linked agarose matrix, Q Sepharose™ (Pharmacia); a cross-linked dextran matrix, QA Sephadex™ (Pharmacia) and a cross-linked polystyrene matrix, Duolite™ A-101 (Rohm and Haas). However none of these are suitable for large scale industrial use, Q Sepharose™ being expensive and QA Sephadex™ suffering from weak mechanical properties as mentioned above. Duolite™ A-101 suffers the disadvantages of most polystyrene based ion exchangers in that generally they are not suitable for use with proteins. In fact Outlinen et. al. in WO 95/19714 (Example 8) demonstrates that Duolite™ A-101 binds neither α-lactalbumin nor β-lactoglobulin in the pH range 5–8. This is typical of the properties of polystyrene based ion exchangers. So once again the processes disclosed suffer from the lack of an anion exchanger particularly useful for an industrial scale process.

Outinen et. al (Lebensm.-Wiss. U.-Technol, 29, 340–343, 1996) surveyed eleven different anion exchangers from five manufacturers. These exchangers were all quaternary ammonium derivatives of cross-linked polystyrene, matrices chosen for their mechanical and chemical stability, for being macroporous and particularly for their low cost. Porosity was a major consideration as open porosity is necessary to aid protein diffusion into and out of the particles and hence important for protein binding capacity. But only one of these, Diaion™ HPA 75 (Mitsubishi Kasei Corp.) was found to have properties suitable for the selective adsorption of β-lactoglobulin from whey. This type of anion exchanger formed the basis of WO 95/19714 for the separation of β-lactoglobulin from whey and whey protein solutions. However even though Diaion™ HPA 75 has the right mechanical properties and cost structure (about 1/100 the cost of QMA Spherosil™) it still suffers the limitation of low protein capacity when compared to conventional, albeit expensive, anion exchangers for protein adsorption. The optimum load of β-lactoglobulin found for Diaion™ HPA 75 was only 16–20 mg of protein/cm$^3$ of exchanger (Outinen, 1996), whereas it would be advantageous to have operating capacities greater than this.

GB 2188526 (1987) discloses the use of anion exchangers to recover a different proteinaceous material from whey at pH 4–6 or more particularly at pH 4.8–5.0. At this pH most of the proteins in whey are not negatively charged and hence are not adsorbed by an anion exchanger. The proteinaceous material, adsorbed at pH 4.8–5.0 and then eluted, is thought to be a mixture of acidic peptides and proteins. Some of these are believed to be present in milk from which the whey is made, and others produced during the manufacture of the whey by the action of proteolytic enzymes on caseins. Many of them are highly sialylated and/or phosphorylated peptides and proteins and they include a group of minor whey proteins known as proteose-peptones. In the case of rennet and cheese whey the major peptide component of this proteinaceous material is glycomacropeptide (GMP) derived from the enzyme action on kappa-casein. In the case of acid whey the proteinaceous material is a mixture of acidic peptides and proteins other than GMP. GB 2188526 thus provides a process for producing GMP containing other acidic peptides and proteins as minor components (from sweet wheys) or a proteinaceous material composed of acidic peptides and proteins but without GMP present (from acid wheys), these products being substantially free of the whey proteins α-lactalbumin, β-lactoglobulin and serum albumin which are isolated by anion exchange at higher pH. Anion exchangers cited in the examples are QMA Spherosil™ (Rhone-Poulenc), Amberlite IRA 958 (Rohm and Haas) and QA Indion™ now known as QA GibcoCel™ (Life Technologies Ltd, Auckland, New Zealand). The Spherosil suffers from being expensive as outlined earlier, the Amberlite™ IRA 958 is a macroporous acrylic based synthetic resin similar to polystyrene resins mentioned earlier in that it also has low capacity for binding proteins. The QA Indion™ is an industrial grade ion exchanger based on regenerated cellulose and normally suitable for protein adsorption but under the particular conditions cited in GB 2188526 found by us to have low capacity for GMP (3 mg/mL).

GB 2251858 (1992) also describes the preparation of ē-casein glycomacropeptide (GMP) using anion exchangers but differs from GB 2188526 in that the anion exchanger is contacted with the milk raw material containing GMP at a pH≧4 instead of pH 4–6. In the applicants' experience this produces a GMP sub-fraction which is highly glycosylated and particularly acidic. (GMP is a mixture of many different glycoforms of the macropeptide.) Anion exchangers cited in this reference are the previously mentioned QMA Spherosil™ and a Sephadex™ exchanger based on cross-linked dextran which is unsuitable for large scale use.

Processes have thus been disclosed for using anion exchangers to prepare whey protein isolate (WPI) from skim milk or whey (GB 1563990), WPI and an immunoglobulin enriched WPC from whey (EP 0320152), β-lactoglobulin and α-lactalbumin enriched protein isolates (GB 1563990), β-lactoglobulin isolate and an α-lactalbuminl enriched WPC (U.S. Pat. No. 5,077,067 and WO 95/19714) and GMP from rennet or cheese wheys or concentrates (GB 2188526 and GB 2251858).

In those cases where skim milk is treated with the anion exchanger at pH 6.6, it has also been disclosed that the resulting milk, depleted in whey protein (especially in β-lactoglobulin), has enhanced heat stability properties useful for the manufacturing of cheeses (FR 2465422, 1981) and other purposes.

Many different anion exchangers are available for demonstrating these processes on a laboratory scale, but few are really suitable for use in the large scale processing of dairy streams for either technical or economic reasons. This might be one reason why these processes in the main have not been commercially utilised.

One matrix that has proved to be particularly useful in large scale separation and purification of whey proteins is regenerated cellulose which has been hydroxyalkylated and cross-linked. Ion exchangers prepared on this matrix are resistant to attrition, have good protein capacity, high flow properties and are available at relatively low cost.

Examples of such ion exchangers based on a hydroxypropylated and cross-linked regenerated cellulose matrix which are commercially available include the SP, CM, QA, and DEAE derivatives sold as SP GibcoCel™, CM GibcoCel™, QA GibcoCel™ and DEAE GibcoCel™ respectively. These ion exchangers were previously sold under the Indion™ brand name. QA GibcoCel™ and SP GibcoCel™ having a substitution level of the QA or SP groups of up to 1.2 milli-equivalents per dry gram (meq/g) are available. SP GibcoCel™, a cation exchanger, has been widely used, but QA GibcoCel™, an anion exchanger, has only enjoyed limited use industrially.

Levison et al (*Chimica Oggi/Chemistry Today*, 41–48, November/December 1994) refers to three custom made QA celluloses with substitution levels of 0.74, 0.96 and 1.24 meq/g, and discloses that these had similar protein capacities.

Antal and Micko (*Carbohydrate Polymers* 19, 167–169, 1992) describe the optimization of the reaction of microcrystalline cellulose with the (3-chloro-2-hydroxypropyl)trimethyl-ammonium chloride. The maximum substitution level of quaternary ammonium groups into the cellulose that they were able to obtain with this reagent was 0.94 meq/g.

The celluloses used by Levison and by Antal are not suitable for repetitive use on a large scale.

With the above background in mind, it is an object of the present invention to provide processes of separating whey proteins from whey protein containing solutions which will go some way towards overcoming the disadvantages of the prior art, or at least to provide the public with a useful choice.

SUMMARY OF THE INVENTION

Accordingly, in a first aspect the present invention provides a process of separating a preselected whey protein or group of whey proteins from a whey protein-containing solution, wherein the process comprises the following steps:
  (a) contacting a whey protein-containing solution with an anion exchanger at a pH level at which the preselected protein or group of proteins adsorbs to the anion exchanger, and wherein the anion exchanger comprises a water insoluble, hydrophilic, water swellable, hydroxy ($C_2$–$C_4$) alkylated and cross-linked regenerated cellulose, derivatised with quaternary amino (QA) groups, wherein the level of substitution of the QA groups is 1.4 milli-equivalents per dry gram of anion exchanger (meq/g) or greater; and
  (b) recovering either or both of the following: (1) the whey protein or proteins adsorbed in step (a) and (2) the breakthrough whey protein or proteins not adsorbed in step (a).

The whey protein-containing solution may be whole milk, skim milk, whey, ultrafiltered or microfiltered milk or whey, reconstituted WPC (whey protein concentrate) or MPC (milk protein concentrate), or any other milk derived material containing whey proteins.

Preferably, the level of substitution of QA groups on the anion exchanger is from about 1.4 to about 2.5 meq/g, more preferably from about 1.5 to about 2.5 meq/g, and most preferably from about 1.7 meq/g to about 2.5 meq/g.

Preferably, the cellulose is hydroxypropylated crosslinked regenerated cellulose, preferably in granulated or beaded form.

In one embodiment of the invention, step (a) comprises contacting the anion exchanger with a whey protein containing solution selected from whey, UF retentate and reconstituted WPC, at a pH of from about 5 to about 8, to selectively adsorb whey proteins other than immunoglobulins.

Preferably, the adsorbed proteins are recovered from the anion exchanger to produce a whey protein isolate (WPI).

Optionally, the breakthrough whey proteins are recovered separately, to produce an immunoglobulin isolate (conveniently by cation exchange) or an immunoglobulin enriched WPC.

In another embodiment of the invention, step (a) comprises contacting the anion exchanger with a whey protein containing solution selected from whey, UF retentate and reconstituted WPC, at a pH of from about 5 to about 8, under conditions in which β-lactoglobulin and acidic peptides and proteins including, when present, glycomacropeptide (GMP) are preferentially adsorbed to the anion exchanger.

Preferably, the adsorbed proteins are recovered from the anion exchanger to produce a WPI.

Optionally, the breakthrough whey proteins are recovered separately to produce an α-lactalbumin containing WPI (conveniently by further anion exchange), an α-lactalbumin/immunoglobulin-containing WPI (conveniently by cation exchange), or a WPC enriched in α-lactalbumin and immunoglobulin.

In a further embodiment of the process of the invention, step (a) comprises contacting the anion exchanger with a whey protein-containing solution selected from sweet whey, UF retentate derived from sweet whey, or reconstituted WPC derived from sweet whey, at a pH of about 5 or below, to selectively adsorb glycomacropeptide (GMP).

Preferably, the anion (exchanger is contacted with the whey protein containing solution at a pH of about 4.5 to about 5.0.

Alternatively, if the preselected whey protein is a glycosylated subfraction of GMP, a pH of about 3.0 to about 4.5 may be used.

Preferably, the adsorbed proteins are recovered from the anion exchanger, to produce a GMP-containing WPI.

Optionally, the breakthrough whey proteins are recovered separately, to produce a GMP-depleted WPC.

In a further embodiment of the process of the invention, step (a) comprises contacting the anion exchanger with a whey protein-containing solution selected from mineral acid whey, lactic acid whey, UF retentate derived from acid whey, or reconstituted WPC derived from acid whey, at a pH of about 5 or below, to selectively adsorb acidic peptides and proteins.

Preferably, the anion exchanger is contacted with the whey protein containing solution at a pH of about 3 to about 5.0.

Preferably, the adsorbed proteins are recovered from the anion exchanger, to produce a WPI containing acidic peptides and proteins substantially free of the major whey proteins.

Optionally, the breakthrough whey proteins are recovered separately, to produce a WPC depleted in acidic peptides and proteins.

In yet a further embodiment of the process of the invention, step (a) comprises contacting the anion exchanger with a whey protein-containing solution selected from whole milk, skim milk or ultrafiltered milk, to adsorb proteins in the milk or milk retentate.

Preferably, the anion exchanger is contacted with the whey protein-containing solution at a pH of from about 6–7, more preferably at about pH 6.6.

Preferably, the adsorbed proteins are recovered from the anion exchanger to produce a WPI.

Optionally, the breakthrough from the anion exchanger is recovered separately, to produce a whey protein reduced milk, skim milk, retentate or milk protein concentrate.

In a further aspect, the invention also provides a whey-protein containing product prepared by a process as defined above.

While the present invention is broadly as defined above, it is not limited thereto and also includes embodiments of which the following description provides examples.

BRIEF DESCRIPTION OF THE DRAWINGS

The present invention will now be described in more detail and with reference to the accompanying drawings, in which.

DESCRIPTION OF THE INVENTION

As defined above, the present invention provides new processes useful for separating whey proteins from whey protein-containing solutions.

The applicants have now found that it is possible to prepare QA derivatives of hydroxyalkylated regenerated cellulose having substitution levels higher than those described in the prior art. We have also surprisingly found that such derivatives, where they exceed substitution levels of 1.4 meq/g, possess advantages over QA derivatives of hydroxylated cross-linked regenerated cellulose having lower substitution levels, in that they have a significantly higher effective protein binding capacity when used to recover protein from protein containing solutions having more than a relatively low ionic strength, and in particular whey protein-containing solutions such as whey, whey protein concentrates and milk.

The finding that a substituted QA-derivatised anion exchanger of the GibcoCel™ type having a minimum substitution level of 1.4 meq/g has an improved protein binding capacity over currently available QA anion exchangers (which have a level of derivatisation of up to 1.2 meq/g) for solutions such as whey is particularly surprising, in view of the fact that the corresponding SP cation exchangers having 0.8 and 1.4 meq/g have been found to be almost equally effective at adsorbing protein from whey (Ayers & Peterson N.Z. J. Dairy Sci. and Technol., 20, 129–142, 1985). Corresponding SP cation exchangers having substitution levels greater than 1.4 meq/g would thus not be expected to show any advantages.

It is these findings by the applicants which form the basis of the present invention.

The present invention relates to processes for separating whey proteins from whey protein-containing solutions which involve the use of the novel anion exchangers described herein. These anion exchangers comprise QA derivatised, hydroxy ($C_2$–$C_4$) alkylated and cross-linked regenerated cellulose, in which the level of derivatisation with the QA groups is 1.4 meq per dry gram of anion exchanger (meq/g) or greater.

In its broadest aspect, the present invention therefore provides a process of separating a preselected whey protein or group of whey proteins from a whey protein-containing solution. The process includes the step of contacting an anion exchanger as defined above with a whey protein-containing solution, at a pH of a level at which the preselected protein or proteins will be adsorbed (bound) to the anion exchanger. The process will then include the additional step(s) of recovering either one or both of (1) the whey protein(s) adsorbed on the anion exchanger, by desorption of the proteins, and (2) the breakthrough whey protein or proteins not adsorbed on the exchanger. Although not essential, it is often desirable from an economic perspective to recover both the adsorbed protein and the breakthrough protein.

The whey protein-containing feed solution used in the process of the present invention can be any solution containing a whey protein or proteins, including whole milk, skim milk, whey, ultrafiltered or microfiltered milk or whey, reconstituted WPC (whey protein concentrate) or MPC (milk protein concentrate), or any other milk derived material containing whey proteins.

The step of contacting the whey protein containing solution with the anion exchanger to adsorb the desired protein or proteins can be carried out in any convenient manner. Preferred methods are to carry out this step in a stirred bed of anion exchanger or in a column of the anion exchanger. It is generally preferred that the adsorption step be carried out at a temperature of less than about 20° C., more preferably at around 8–15° C., to minimise the growth of mesophilic bacteria. It is also preferred that the contact time of the anion exchanger with the whey protein solution is less than about 2 hours, more preferably less than about 1 hour.

Those persons skilled in the art will appreciate that by selecting an appropriate pH at which a desired whey protein or group of whey proteins is known to bind to an anion exchanger, selective adsorption of the desired whey protein or group of whey proteins can be achieved. The following table shows how anion exchangers can be used to bind one or more proteins from whey to produce whey protein isolates and how other proteins are left behind in the treated whey stream. The breakthrough proteins may be recovered, to give whey protein concentrates with enriched levels of those proteins (and depleted levels of protein removed). Alternatively, some or all of the breakthrough proteins may be recovered by further anion or cation exchange.

TABLE

| Protein* | Whey protein Composition (%) | Isoelectric pH (IEP) | Adsorption on Anion Exchangers | |
|---|---|---|---|---|
| | | | At pH 3–5 | At pH 5–8 |
| GMP | 20 | 2–4 | Yes | Yes |
| β-Lg | 46 | 5 | No | Yes |
| α-Lac | 18 | 5 | No | Yes |
| Ig | 6 | ≈7 | No | No |
| Other | 10 | Various | — | — |

*GMP—glycomacropeptide, also known as caseinomacropeptide (CMP) or casein derived peptide (CDP). Only found in sweet wheys, not acid wheys nor milk.
β-Lg—β-lactoglobulin.
α-Lac—α-lactalbumin
Ig—immunoglobulin
Other—BSA, lactoferrin and other minor proteins.

The steps of recovery of either or both of the adsorbed protein and the breakthrough protein can be carried out using any suitable method known in the art, for example by elution of the adsorbed protein (which may be achieved for example using salt, dilute acid or a mixture of the two), followed by ultrafiltration and/or diafiltration if desired, and evaporation, freeze-drying and/or spray drying.

The QA anion exchangers useful in the processes of the present invention have a level of substitution of the QA groups of 1.4 meq/g or greater. It is preferred that in the QA anion exchangers, the level of substitution of the QA groups is in the range of from about 1.4 to about 2.5 meq/g, more preferably from about 1.5 to about 2.5 meq/g, and most preferably from about 1.7 meq/g to about 2.5 meq/g.

In this specification, the term "QA" or "quaternary amino", when used in the context of ion exchangers, means a functional group selected from a group of the formula —$R_1$—Z, wherein $R_1$ is a lower alkylene group containing 1 to 3 carbon atoms and optionally substituted with a hydroxyl group, and Z is a quaternized amino group of the formula: —$NR_2R_3R_4^+OH^-$ or salts thereof, wherein $R_2$, $R_3$ and $R_4$ are each a lower alkyl group containing 1 to 4 carbon atoms, optionally substituted with a hydroxyl group, or a further group of the formula —$R_1$—$NR_2R_3R_4^+OH^-$ or salts thereof wherein $R_1$, $R_2$, $R_3$ and $R_4$ are as defined above. Examples of suitable QA groups are —$CH_2CH_2N^+R_2R_3R_4Cl^-$ and —$CH_2CHOHCH_2N^+R_2R_3R_4Cl^-$, wherein $R_2$, $R_3$ and $R_4$ are the same or different and are selected from —$CH_3$, —$CH_2CH_3$, —$CH_2CH_2OH$, —$CH_2CHOHCH_3$, —$CH_2CH_2N^+R_2R_3R_4Cl^-$ and —$CH_2CHOHCH_2N^+R_2R_3R_4Cl^-$.

The matrix for the anion exchangers used in the processes of the present invention comprises a water insoluble, hydrophilic, water swellable hydroxy($C_2$–$C_4$)alkylated and cross-linked regenerated cellulose. Such matrices and processes for preparing them are described for example in U.S. Pat. No. 4,175,183 (John S Ayers), the full contents of which are incorporated herein by reference. By way of example, a suitable cellulose matrix can be prepared by reacting commercially available granular or beaded regenerated cellulose with epichlorohydrin and propylene oxide in the presence of a strong base (conveniently NaOH). Such matrices may be useful for repetitive use on a large industrial scale.

The QA anion exchangers used having a substitution level of 1.4 meq/g or greater may be prepared by reacting a cellulose matrix as described above with a suitable alkylating agent capable of derivatising the cellulose with QA groups. Conveniently, the alkylating agent may be an agent containing quaternary ammonium groups, preferably (3-chloro-2-hydroxypropyl)trimethylammonium chloride (CHPTAC) or glycidyltrimethyl ammonium chloride (GTAC), and the reaction carried out in the presence of a strong base, conveniently sodium or potassium hydroxide. CHPTAC and GTAC are known reagents for introducing QA groups into cellulose, but at lower substitution levels (see, for example Carbohydrate Polymers 19, 167–169, 1992). However, in order to prepare the anion exchangers having the level of QA substitution useful in the processes of the present invention, it will usually be necessary to employ very concentrated solutions of reagents. For example, it is preferred that when CHPTAC is used as the allylating agent, the concentration of CHPTAC reagent is about 50 wt % or greater, more preferably about 60 wt % or greater, and when GTAC is used, the concentration of GTAC reagent is greater than 50% w/v, more preferably about 70% w/v or greater.

By way of example, the following process may be used to prepare the QA anion exchangers having a substitution level of 1.4 meq/g or greater.

A water insoluble, hydrophilic, water swellable hydroxypropylated and cross linked regenerated cellulose may be prepared by first forming a mixture of 10 g regenerated cellulose with 3–10 mL of propylene oxide, 0.5–1 mL of epichlorohydrin and 8–20 mL of aqueous sodium hydroxide solution at a concentration of 15–40% (w/v), or 10–15 mL of aqueous sodium hydroxide solution at a concentration of 20–30% (w/v). The mixture is then reacted at 40–60° C. for 1–4 hours. At the end of reaction, most of the sodium hydroxide remains in the matrix still, as only the reactions of epichlorohydrin consume base. It is preferable to leave the hydroxide in the cellulose for further reaction with the alkylating reagent.

When GTAC is used as the alkylating agent, 15–20 mL of 70% (w/v) solution is mixed in with the cellulose and reaction accomplished at 10–50° C. over 1–8 hours, preferably 20–25° C. for 2–3 hours. The reaction of GTAC is catalysed by hydroxide. The reaction time and temperature are thus not greatly dependent on the amount of GTAC added. The amount of GTAC reagent added will be selected to achieve the desired substitution level.

When CHPTAC is used as the alkylating agent, 12–20 mL of a 60 wt % solution is mixed in, with the cellulose and reaction accomplished at 20–50° C. for 2–24 hours, preferably at 25° C. for 6–24 hours, although the time can be shortened by heating to 60–80° C. for 1–2 hours at the finish. Hydroxide is consumed during this reaction and the reaction time increases as the amount of reagent used is increased as a result of consumption of hydroxide by the competing alkylation and hydrolysis reactions.

In the case of both the GTAC and CHPTAC reagents it is preferable to keep the volume added to 20 mL or less (when working with the above proportions) so that a separate aqueous phase does not separate out from the cellulose. To limit the competing hydrolysis reactions of the reagents it is desirable to limit the amount of water present in the reaction mixture and use the highest concentration of reagent available.

In either of the above processes, it is possible to repeat the QA derivatisation procedure, if required, where a relatively high level of derivatisation (such as around 2.0 meq/g or higher) is desired. In such cases one would use the following alternative procedure.

Alternatively, the QA anion exchangers useful in the processes of the present invention may be prepared by using as the starting material a commercially available QA hydroxyalkylated and cross-linked regenerated cellulose, such as that sold as QA GibcoCel™, which has a QA substitution level of 1.2 meq/g. The applicants have found that a higher QA substitution level can be achieved by further processing the already derivatised exchanger using alkylating agents bearing quaternary ammonium groups such as GTAC and CHPTC, again in the presence of a strong base.

By way of example, the following process may be used to prepare the QA anion exchangers useful in the processes of the present invention, having a substitution level of 1.4 meq/g or greater, using a similarly but lower substituted exchanger (conveniently QA GibcoCel™) as a starting material.

QA GibcoCel™ in its hydrated form has a dry matter content of only 12–13%. Because of the large amount of water already present in the product, it is often preferable to process this further as a slurry with alkylating agent and base. Accordingly, hydrated QA GibcoCel™ is mixed with extra water and concentrated sodium hydroxide solution to form a thick slurry with a final sodium hydroxide concentration of 1.5–3.0% (w/v), taking into account the water already present in the hydrated QA GibcoCel™ (85–90% of its wet weight). CHPTAC, at a concentration of 60 wt %, is added in an amount of 5–25 mL/100 g of QA GibcoCel™ to achieve the desired increase in substitution level. The conditions should be chosen such that there is an excess of hydroxide present over CHPTAC in the reaction mixture. Reaction is generally accomplished at 10–50° C. for 2–24 hours, preferably 20–30° C. for 6–24 hours, or 17 hours with a further 1–2 hours at 60–80° C.

In either of the above methods of preparing a QA anion exchanger of the invention, the sodium hydroxide could be replaced by an equivalent amount of potassium hydroxide.

A number of specific embodiments of the processes of the present invention of separating whey proteins from whey protein-containing solutions will now be described.

In one embodiment, the process comprises the step of contacting the anion exchanger with whey, UF retentate or reconstituted WPC, at a pH of from about 5 to about 8, to selectively adsorb whey proteins other than immunoglobulins. The adsorption step is followed by recovery of one or both of the adsorbed whey proteins (by eluting these from the exchanger) and the breakthrough protein. In this embodiment of the invention, elution and recovery of the adsorbed proteins will produce a WPI. The residual protein in the breakthrough is enriched in immunoglobulins and recovery of this protein by known procedures, such as cation exchange or ultrafiltration, will produce an immunoglobulin isolate or immunoglobulin enriched WPC respectively.

In another embodiment of the process of the present invention, the process includes the step of contacting the anion exchanger with whey, UF retentate or reconstituted WPC at a pH of about 5 to about 8, under conditions in which β-lactoglobulin and acidic peptides and proteins (including GMP when the whey protein. containing solution is sweet whey or derived from sweet whey) are preferentially adsorbed. The desired preferential adsorption can conveniently be achieved by providing insufficient anion exchanger capacity for both α-lactalbumin and β-lactoglobulin to bind to the exchanger. Under such conditions, β-lactoglobulin will bind to the exchanger in preference to α-lactalbumin.

Again, in this embodiment of the invention the adsorption step is followed by recovery of one or both of the adsorbed whey proteins and the breakthrough whey protein. Recovery of the adsorbed proteins from the exchanger will produce a WPI enriched in β-lactoglobulin and acidic peptides and proteins (including GMP if present in the whey). The partially deproteinated breakthrough may be further processed by known procedures such as anion exchange, cation exchange or ultrafiltration to recover additional protein, in particular α-lactalbumin and/or immunoglobulin. For example, concentration of the breakthrough by ultrafiltration followed by drying will produce a WPC powder enriched in both α-lactalbumin and immunoglobulins compared with a conventional WPC.

In a further embodiment of the process of the present invention, the process includes the step of contacting the anion exchanger with sweet whey, a UF retentate derived from sweet whey, or reconstituted WPC from sweet whey, at a pH of about 5 or below, to selectively adsorb glycomacropeptide (GMP).

It is generally preferred that the pH of the sweet whey, UF retentate or reconstituted WPC is contacted with the anion exchanger at a pH of about 4.5 to about 5.0, more preferably about pH 4.7–4.9. However, a pH of 3.0-4.5 may be used when the preselected whey protein is a glycosylated subfraction of GMP.

In this embodiment of the invention, the GMP (or a glycosylated subfraction of GMP) may then be recovered from the anion exchanger and/or the breakthrough protein recovered as a WPC depleted in GMP (or a glycosylated subfraction of GMP).

In a further embodiment of the process of the present invention, the process includes the step of contacting the anion exchanger with an acid whey, a UF retentate derived from an acid whey, or reconstituted WPC from an acid whey, at a pH of about 5 or below, to selectively adsorb acidic peptides and proteins substantially free of the major whey proteins.

It is generally preferred that the pH of the acid whey, UF retentate or reconstituted WPC is contacted with the anion exchanger at a pH of about 3 to about 5.0, more preferably about pH 4.7–4.9.

In this embodiment of the invention, the acidic peptides and proteins may then be recovered from the anion exchanger and/or the breakthrough protein recovered as a WPC depleted in acidic peptides and proteins.

In yet a further embodiment of the process of the present invention, the process includes the step of contacting the anion exchanger with whole milk, skim milk or ultrafiltered milk to adsorb whey proteins, particularly β-lactoglobulin. The milk or milk retentate is preferably contacted with the ion exchanger at a pH of from about 6–7, more prefer:ably about pH 6.6.

In this embodiment of the invention, the adsorbed whey proteins may be recovered from the anion exchanger as a WPI. Alternatively, or in addition, the breakthrough may be recovered as a whey protein reduced milk, skim milk, retentate or milk protein concentrate, with useful properties such as enhanced heat stability.

The invention will now be described in more detail with reference to the following non-limiting examples.

EXAMPLES

Example 1

QA GibcoCel™ HG2 (1.17 meq/g), an anion exchanger made from granular regenerated cellulose, was obtained from Life Technologies Ltd, Auckland, New Zealand. It was suspended in water and then collected on a sintered glass filter where it was washed with 1 M hydrochloric acid, water, 1 M sodium hydroxide and finally de-ionised water. It was then drained of excess water by vacuum filtration. This QA cellulose in its hydroxide form was then further alkylated to raise the density of positively charged QA groups.

The QA GibcoCel[OH$^-$] was made up to a thick slurry by the addition of water and 30% (w/v) aqueous sodium hydroxide. The mixture was chilled before adding (3-chloro-2-hydroxypropyl)trimethylammonium chloride (60 wt. % solution in water). The amounts used are shown in Table 1. These ingredients were mixed as a slurry for 17 hours at room temperature followed by 2 hours at 60 C. The QA cellulose products were collected on filters and washed with water, 1 M hydrochloric acid and de-ionised water before removing the excess water by vacuum filtration.

Small samples of each product, and the starting QA GibcoCel, were analysed to determine their substitution levels of QA groups. About 5 g of the moist products were converted to their hydroxide form by washing with 1M sodium hydroxide followed by demineralized water. The samples were then titrated in 1 M sodium chloride with 1.00 M hydrochloric acid to an end-point of pH 4. After titration each sample was collected on a dry tared sintered-glass filter, washed with water and dried overnight at 105 C. The substitution level was calculated as the small ion exchange capacity (S.I.C.) in milli-equivalents per dry gram (meq/g), i.e. S.I.C.=V/wt where V=volume in mL of 1.00 M HCl, and wt=dry weight of the sample (g).

Further samples in the chloride form were assayed for their protein binding capacities. A 0.5% solution of β-lactoglobulin was prepared in 0.01 M sodium dihydrogen phosphate. The pH of this solution was adjusted to 7.5 by the careful addition of 5 M sodium hydroxide. Aliquots (20 mL) were transferred to vials containing weighed samples of moist QA cellulose (300–400 mg). The vials were then sealed and gently mixed for 2 hours at room temperature. They were left to stand for 2–5 minutes before a sample of the supernatant was taken and filtered through a 2 mL disposable column fitted with a porous frit. A 1 mL sample of the filtrate was added to 20 μL of 1 M hydrochloric acid and made up to 10 mL total volume with water before measuring the absorbance at 280 nm. The dry matter of the ion exchanger used was determined by drying samples (0.5–1.0 g) in triplicate. The capacity of the exchanger, grams of protein per gram of dry ion exchanger, was calculated by comparison with an $A_{280}$ reading of the original protein solution diluted similarly.

The results, shown in Table 1, clearly indicate that the substitution level of quaternary amino groups on QA GibcoCel can be raised to 2 meq/g by this alkylation procedure but that there is no benefit for the β-lactoglobulin (β-lg) capacity under conditions that are typically used to measure protein capacity. In fact the capacity deteriorated, particularly for preparation #3.

TABLE 1

Preparation Details and Properties of QA Celluloses

| | QA GibcoCel | Prep$^n$ #1 | Prep$^n$ #2 | Prep$^n$ #3 |
|---|---|---|---|---|
| Preparation | | | | |
| QA GibcoCel (wet g) | — | 45 | 45 | 45 |
| Water (mL) | — | 31 | 31 | 28.5 |
| 30% NaOH (mL) | — | 5 | 5 | 7.5 |
| CHPTAC* (mL) | — | 3 | 6 | 9 |
| Properties | | | | |
| S.I.C. (meq/g) | 1.17 | 1.51 | 1.84 | 2.02 |
| β-Ig capacity (g/g) | 1.85 | 1.75 | 1.65 | 1.38 |

*3-chloro-2-hydroxypropyltriethylammonium chloride, 60 wt % solution in water

Example 2

(a) Preparation of Hydroxypropyl Cellulose (HP-Cellulose)

The same Grade 2 (150–250 mm) granular regenerated cellulose as used to make the commercially available anion exchanger QA GibcoCel used in Example 1, was obtained from Life Technologies Ltd, Auckland, New Zealand. A sample (10 g) of this was mixed in a stainless steel vessel with cold 30% (w/v) aqueous sodium hydroxide (15 mL) and 0.7 mL of epichlorohydrin dissolved in 5 mL of propylene oxide. The mixture was stirred thoroughly until the cellulose had finished swelling and all the liquid had been absorbed. The reaction vessel was then sealed and placed in a water bath at room temperature and heated to 50° C. over 30 minutes. After one hour at 50° C. the reaction vessel was cooled and the damp, friable cellulose powder (cross-linked and hydroxypropylated cellulose, HP-cellulose) was treated further without washing.

(b) Alkylation with (3-chloro-2-hydroxypropyl)trimethylammonium chloride (CHPTAC)

After chilling the reaction vessel and contents, an aqueous solution of (3-chloro-2-hydroxypropyl)trimethylammonium chloride (18 mL of 60 wt. %) was slowly added to it while stirring thoroughly. It was then held at 25 C. for 17 hours followed by 1.5 hours at 60 C. The QA cellulose product was soaked in excess water and collected on a filter, washed with water, 1M hydrochloric acid and then de-ionised water. Samples were analysed as described in Example 1. The substitution level was found to be 2.08 meq/g, the â-lactoglobulin capacity 2.03 g/g.

Example 3

A sample of QA cellulose (2.08 meq/g) from Example 2 was further processed in place of QA GibcoCel (1.17 meq/g) as described in Example 1 for preparation #2. Six mL of (3-chloro-2-hydroxypropyl)trimethylammonium chloride was reacted with 45 g of QA cellulose[OH⁻], 31 mL of water and 5 mL of 30% (w/v) aqueous sodium hydroxide. The product had a substitution level of 2.52 meq/g, and a β-lactoglobulin capacity of 1.96 g/g.

Example 4

Figure 1:
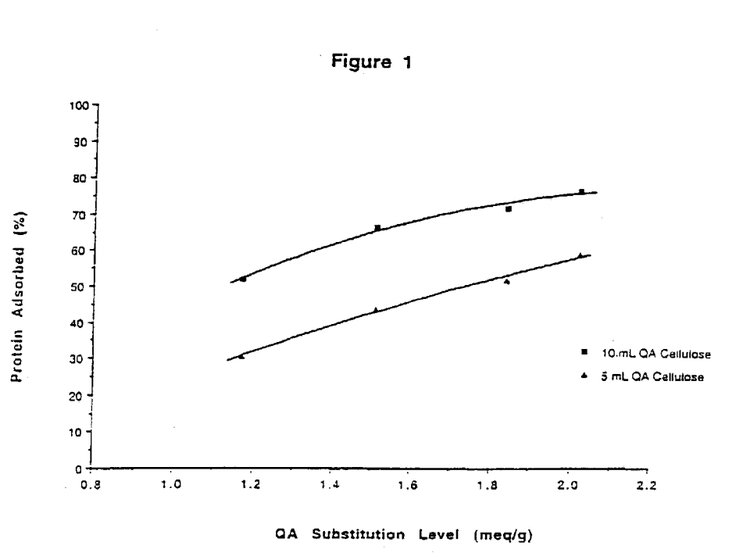
FIG. 1 shows the protein adsorbed from 50 mL of whey at pH 6.5 as a function of the substitution level of QA groups on the cellulose.

Clarified cheese whey was adjusted from pH 5.7 to 6.5 with aqueous sodium hydroxide. Aliquots (50 g) of this were then mixed at room temperature with 5 mL (3.33 g) and 10 mL (6.67 g) samples of QA GibcoCel and of the more highly substituted QA celluloses prepared from it (Preparations #1, #2 and #3 from Example 1). (All the QA celluloses after washing and draining were found to have a settled volume of 1.5 mL/wet g by separate experiment where a sample (about 10 g) was allowed to settle in water in a 25 mL measuring cylinder overnight.) After mixing for 1 hour, the QA celluloses were separated from the protein-depleted whey on sintered-glass filters and washed with water. The combined filtrate and washings (60 g) were analysed for total nitrogen and non-protein nitrogen to determine the residual protein concentrations. A sample of the cheese whey at pH 6.5 was similarly analysed and the amount of protein (%) adsorbed by each of the QA celluloses calculated. The results, seen in FIG. 1, clearly show the increase in protein adsorption achieved as the substitution level of the QA GibcoCel was raised above 1.2 meq/g.

Samples of the whey and the protein-depleted filtrates were also analysed by reverse phase HPLC to determine the concentrations of the individual proteins, α-lactalbumin, â-lactoglobulin, glycomacropeptide and immunoglobulin using the method published in *J. Chromatography A*, 878 (2000), 183–196. These values were then divided by the total protein concentration to determine the amount of each protein as a percentage of the total protein remaining in the mixture.

Figure 2:
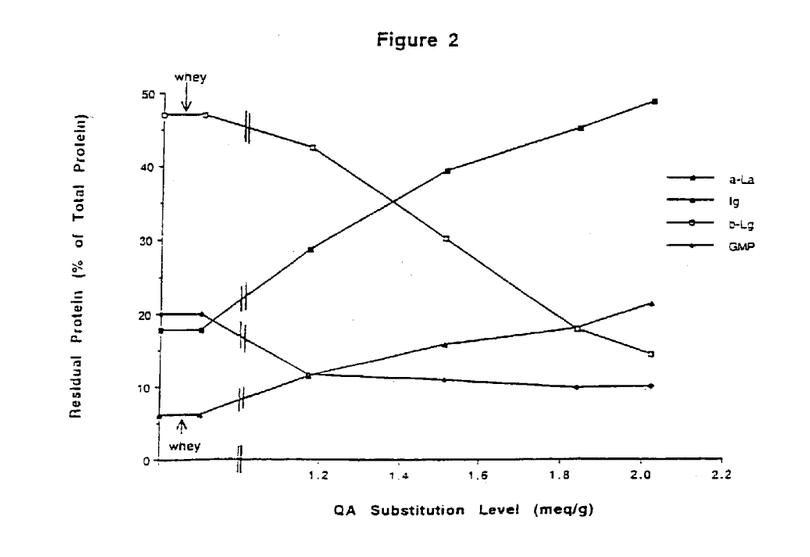
FIG. 2 shows the composition of non-adsorbed protein remaining in the whey (50 mL) after treatment with QA cellulose (10 mL) as a function of the substitution level of QA groups on the cellulose.

The results, when 50 g of whey was mixed with 10 mL (6.67 g) of QA cellulose at pH 6.5, are shown in FIG. 2. To obtain the efficient adsorption of â-lactoglobulin and glycomacropeptide, it was necessary to have a substitution greater than 1.2 meq/g on the QA cellulose anion exchanger. WPC powders produced from the filtrates would then be considerably more enriched in α-lactalbumin and immunoglobulins compared with WPC prepared from whey or the filtrate from QA GibcoCel as shown in Table 2.

TABLE 2

α-Lactalbumin and Immunoglobulin in Whey before and after treatment with QA Cellulose (% of total protein present)

| | | QA Cellulose treated whey | | |
|---|---|---|---|---|
| Protein | Whey | GibcoCel (1.17 meq/g) | Prep$^n$ #1 (1.51 meq/g) | Prep$^n$ #3 (2.02 meq/g) |
| α-Lactalbumin | 18 | 29 | 40 | 49 |
| Immunoglobulin | 6 | 11 | 16 | 21 |

The QA cellulose (2.08 meq/g) from Example 2, which was made in a single quaternization step, behaved similarly to the further processed QA GibcoCel preparation #3 shown here.

Example 5

UF retentate (21% TS, 15% protein), prepared commercially from the same cheese whey as used in Example 4, was diluted with water and adjusted from pH 5.7 to 6.5 with aqueous sodium hydroxide. The amount of water used for dilution was either half or one and a half times the weight of retentate as shown in Table 3, i.e. either (2+1) or (2+3) respectively. Samples, 10 g or 16.7 g respectively, of these diluted retentates were then added to 9.6 mL (6.4 g) of the four QA celluloses from Example 1 and mixed for one hour. After this the QA celluloses were separated from the protein-depleted-retentate on sintered-glass filters and washed with water until the filtrate was clear. The combined filtrate and washings (30 g) were analysed for total nitrogen to determine the residual protein concentration in each. The diluted retentates at pH 6.5 were similarly analysed and the amount of protein (%) adsorbed by each of the QA celluloses calculated.

Figure 3:
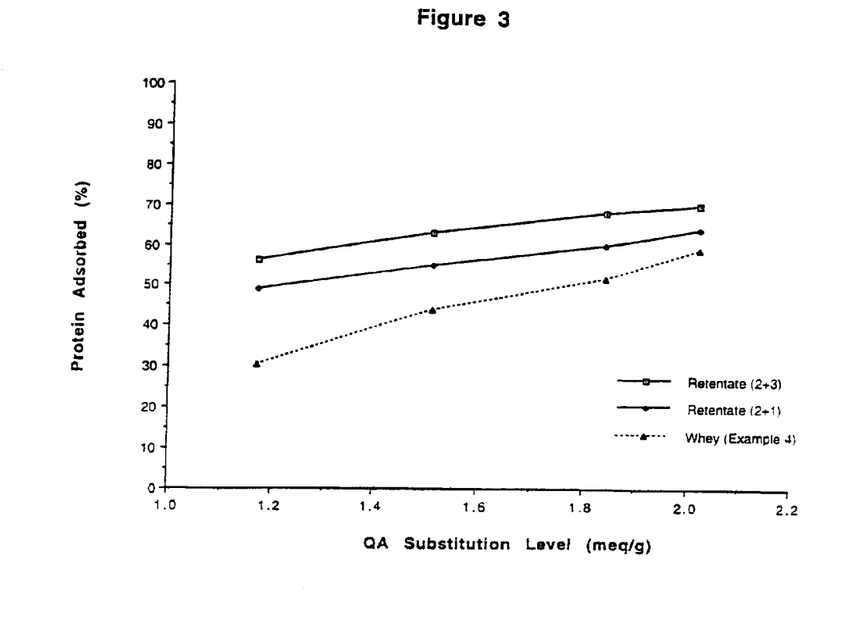
FIG. 3 shows the protein adsorbed at pH 6.5 from cheese whey retentate diluted with water (retentate+water) as a function of the substitution level of QA groups on the cellulose.

The results, presented in FIG. 3, show the increase in protein adsorption efficiency with increasing QA substitution level even when the retentate is diluted with one and a half times its own weight of water to lower the ionic strength. This reduction in ionic strength is used to increase the binding capacity of the anion exchangers (WO Patent 97/26797). The capacities of the four QA cellulose used here are shown in Table 4. It is surprising to find that even under these conditions of relatively low ionic strength of 3.3 mS/cm (equivalent to about 30 mM NaCl) that the QA GibcoCel does not have sufficient density of charged groups to exhibit optimum adsorption capacity.

TABLE 3

Conditions for protein adsorption from whey and diluted retentate

| | | Diluted Retentate | |
|---|---|---|---|
| | Whey* | (2 + 1)** | (2 + 3)** |
| Protein conc., % | 0.68 | 10.1 | 6.0 |
| Weight used, g | 50 | 10 | 16.7 |
| Conductivity at pH 6.5, mS/cm | 6.7 | 4.8 | 3.3 |
| QA cellulose, mL | 5 | 9.6 | 9.6 |
| Protein load, mg/mL of QA | 68 | 105 | 104 |

*Conditions used in Example 4
**Parts of retentate plus parts of water

TABLE 4

Protein Capacities (mg/mL) of the QA celluloses

|  | QA Gibcocel (1.17 meq/g) | Prep$^n$ #1 (1.51 meq/g) | Prep$^n$ #2 (1.84 meq/g) | Prep$^n$ #3 (2.02 meq/g) |
|---|---|---|---|---|
| Whey* | 21 | 30 | 35 | 40 |
| Retentate (2 + 1)** | 52 | 58 | 63 | 67 |
| Retentate (2 + 3)** | 58 | 65 | 70 | 72 |

*Results from Example 4
**Parts of retentate plus parts of water

The protein (WPI) was recovered from each of the washed QA celluloses by transferring it from the funnel to a beaker and adding sufficient water to enable it to be stirred. Sodium chloride (5M) was added to make the solution about 80 mM and then the pH was adjusted to 2.0 with 10% hydrochloric acid. After stirring for a further 50 minutes the QA cellulose was returned to its filter and washed with water. The combined filtrate and washings (eluate) was neutralised to pH 6–7 and made up to 50 mL with water and analysed for total nitrogen (protein). A greater yield of WPI was obtained in the eluates from each of the QA celluloses with raised substitution levels (1.51–2.02 meq/g) than that from the QA GibcoCel (1.17 meq/g).

Example 6

Two 10 mL columns were packed with GibcoCel QA (1.17 meq/g) and QA cellulose (1.8 meq/g) (Preparation #2 from Example 1) respectively. Skim milk (150 g) was passed through each column over 4–5 hours followed by 10 mL of water to displace the last of the milk from each column. The first 5 mL of breakthrough (effluent) from the column was discarded and then 155 g of breakthrough and washings were collected as one bulk fraction except for 0.5 mL samples which were collected separately every 20 mL.

Samples of the original skim milk, the bulk fraction of treated milk and column effluent samples were each diluted 1:1 with 0.2 M acetate buffer, pH 4.0, to precipitate casein which was removed by centrifugation. Samples of the whey supernatant were analysed for BSA, α-lactalbumin and â-lactoglobulin by reverse phase HPLC. The results are shown in Table 5 and FIG. 4.

TABLE 5

Whey protein adsorption (%) from 150 g of skim milk by 10 mL of QA GibcoCel (1.17 meq/g) and Preparation #2 (1.84 meq/g)

|  | QA GibcoCel | Preparation #2 |
|---|---|---|
| β-lactoglobulin | 62 | 92 |
| α-lactalbumin | 10 | 20 |
| BSA | 17 | 35 |

Figure 4:
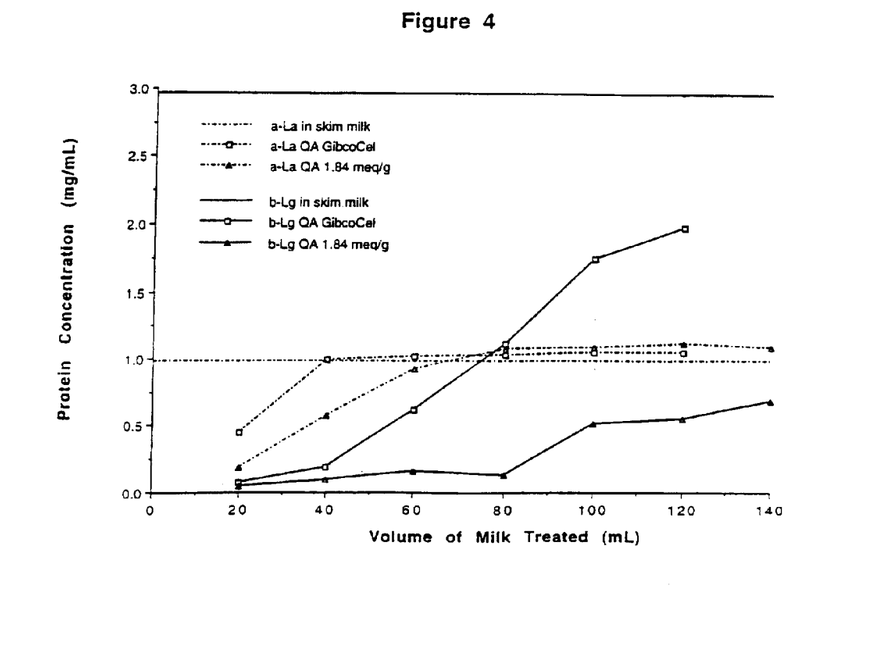
FIG. 4 shows the concentration of α-lactalbumin and β-lactoglobulin in skim milk after passage through a column (10 mL) of either QA GibcoCel™ or QA cellulose with 1.84 meq/g.

The higher substituted QA cellulose achieved >90% removal of â-lactoglobulin from 15 column bed volumes of skim milk versus only about 60% for QA GibcoCel. FIG. 4 shows that QA cellulose with 1.84 meq/g can treat about twice the volume of skim milk as can QA GibcoCel before â-lactoglobulin appears in the breakthrough in significant quantities.

The â-lactoglobulin and other proteins were recovered from each of the QA celluloses by transferring it from the column to a beaker and treating it as described in Example 5.

Example 7

A sample (200 g) of freshly prepared UF retentate (21% TS, 15% protein), commercially produced from cheese whey, was diluted with 200 mL of water and adjusted in pH to 4.7 with 10% hydrochloric acid. The resulting solution had a glycomacropeptide (GMP) concentration of 1.2% which was about 16% of the total protein present. Aliquots (28 g) of this (1+1) diluted retentate were added to samples of QA celluloses (equivalent to 20 or 28 mL) previously weighed into 50 mL beakers. These were stirred for 40 minutes whilst maintaining the pH at 4.7–4.8 with 1 M sodium hydroxide. Each QA cellulose was then collected on a sintered-glass filter and washed with water. The combined filtrate and washings (breakthrough) was made up to 50 g with water for analysis. On a production scale the breakthrough could be neutralised and concentrated by ultrafiltration to give a WPC with minimal GMP present.

Each QA cellulose was transferred to a clean dry beaker and water added to give a total weight of 30 g (QA cellulose plus water). To this was added 480 μL of 5 M sodium chloride to make the solution approximately 80 mM. The pH was then adjusted to 2.0 with 10% hydrochloric acid to elute the GMP. After stirring for 40 minutes the QA cellulose was returned to its filter and washed with water. The combined filtrate and washings (eluate) was neutralised to pH 6–7 and made up to 40 g for analysis.

The breakthrough and eluate were analysed for GMP, α-lactalbumin, â-lactoglobulin and BSA by HPLC using a reverse phase column. The GMP results are shown in Table 6.

TABLE 6

Selective GMP Adsorption from 28 g of diluted Retentate (1 + 1) by QA Celluloses and Elution therefrom

| | QA Cellulose | | Yield of GMP (%) | |
|---|---|---|---|---|
| Type | Subst$^n$ meq/g) | Volume (mL) | Break-through | Eluate |
| Preparation #2 | 1.84 | 20 | 14 | 78 |
| QA GibcoCel | 1.17 | 20 | 28 | 68 |
| QA GibcoCel | 1.17 | 28 | 16 | 75 |

The more highly substituted QA cellulose (Preparation #2 from Example 1) achieved a significantly higher yield of GMP in the eluate compared with QA GibcoCel. For the latter to achieve the same yield required at least a 40% increase in the volume of ion exchanger used (28 mL in place of 20 mL). In all three cases the eluate fraction (GMP) contained only 14–17% of the total protein present in the original 28 g of diluted retentate. Furthermore, α-lactalbumin, â-lactoglobulin and BSA together made up only 6–7% of the protein in the eluate showing that the adsorption was selective for GMP.

INDUSTRIAL APPLICATION

The applicants have found that the novel anion exchangers described herein have a higher protein capacity under all conditions of ionic strength, except low ionic strength (eg <25 mM) than known, commercially available QA derivatised hydroxyalkylated cross-linked regenerated cellulose anion exchangers with a lower level of QA substitution. The applicants have further found that the present anion exchangers maintain their protein capacity up to modest ionic strength, about 50 mM NaCl, allowing them to be more industrially useful than known commercially available QA derivatised hydroxyalkylated cross-linked regenerated cellulose anion exchangers with a lower level of QA substitution. The latter loses capacity immediately the ionic strength is raised above the minimum level provided by the dilute buffer salts, i.e. about 10 mM.

It is therefore believed that the present invention, involving the use of the anion exchangers described herein, provides processes of separating whey proteins from whey protein-containing solutions which offer increased efficiency over processes known in the art.

Although the invention has been described with reference to particular embodiments, those persons skilled in the art will appreciate that variations and modifications may be made without departing from the scope of the invention as defined in the accompanying claims.

What is claimed is:

1. A process of separating a preselected whey protein or group of whey proteins from a whey protein-containing solution, wherein the process comprises the following steps:
    (a) containing a whey protein-containing solution with an anion exchange at a pH level at which the preselected protein a group of proteins adsorbs to the anion exchanger, and wherein the anion exchanger comprises a water insoluble, hydrophilic, water swellable, hydroxy ($C_2$–$C_4$) alkylated and cross-linked regenerated cellulose, derivatised with quaternary amino (QA) groups, wherein the level of substitution of the QA groups is 1.4 milli-equivalents per dry gram of anion exchanger (meq/g) or greater; and
    (b) recovering either or both of the following: (1) the whey protein or proteins adsorbed in step (a) and (2) the breakthrough whey protein or proteins not adsorbed in step (a).

2. A process as claimed in claim 1, wherein the whey protein-containing caution is whole milk, skim milk, whey, ultrafiltered or microfiltered milk or whey, reconstituted WPC (whey protein concentrate) or MPC (milk protein concentrate), or any other milk derived material containing whey proteins.

3. A process as claimed in claim 1, wherein, the level a substitution of QA groups on the anion exchanger is from about 1.4 to about 2.5 meq/g.

4. A process as claimed in claim 3, wherein the level of substitution of QA groups is from about 1.5 to about 2.5 meq/g.

5. A process as claimed in claim 4, wherein the level of substitution of QA groups is from about 1.7 meq/g to about 2.5 meq/g.

6. A process as claimed in claim 1, wherein the cellulose is hydroxypropylated cross-linked regenerated cellulose.

7. A process as claimed in claim 6, wherein the cellulose is in granulated or beaded form.

8. A process as claimed in claim 1, wherein step (a) comprises containing the anion exchanger with a whey protein containing solution selected from whey, UF retentate and reconstituted WPC, at a pH of from about 5 to about 8, to selectively adsorb whey proteins other than immunoglobulins.

9. A process as claimed in claim 1 or 8, wherein the adsorbed proteins are recovered from the anion exchanger to produce a whey protein isolate (WPI).

10. A process as claimed in claim 1 or 8, wherein the breakthrough whey proteins are recovered separately, to produce an immunoglobulin isolate or an immunoglobulin enriched WPC.

11. A process as claimed in claim 10, wherein the breakthrough whey proteins are recovered by cation exchange.

12. A process as claimed in claim 1, wherein step (a) comprises contacting the anion exchanger with a whey protein containing solution selected from whey, UF retentate and reconstituted WPC, at a pH of from about 5 to about 8, under conditions in which β-lactoglobulin and acidic peptides and proteins including, when present, glycomacropeptide (GMP) are preferentially adsorbed to the anion exchanger.

13. A process as claimed in claim 12, wherein the adsorbed proteins are recovered from the anion exchanger to produce a WPI.

14. A process as claimed in claim 12, wherein the breakthrough whey proteins are recovered separately to produce an α-lactalbumin containing WPI, an α-lactalbumin/immunoglobulin-containing WPI, or a WPC enriched in α-lactalbumin and immunoglobulin.

15. A process as claimed in claim 14, wherein the α-lactalbumin containing WPI is produced by further anion exchange.

16. A process as claimed in claim 14, wherein the α-lactalbumin/immunoglobulin containing WPI is produced by cation exchange.

17. A process as claimed in claim 1, wherein step (a) comprises contacting the anion exchanger with a whey protein-containing solution selected from sweet whey, UF retentate derived from sweet whey, or reconstitute WPC derived from sweet whey, at a pH of about 5 or below, to selectively absorb glycomacropeptide (GMP).

18. A process as claimed in claim 17, wherein the anion exchanger is contacted with the whey protein containing solution at a pH of about 4.5 to about 5.0.

19. A process as claimed in claim 17, wherein if the preselected whey protein is a glycosylated subtraction of GMP, a pH about 3.0 to about 4.5 is used.

20. A process as claimed in any one of claims 17 to 19, wherein the adsorbed proteins are recovered from the anion exchanger, to produce a GMP-containing, or a glycosylated subfraction of GMP-containing WPI.

21. A process as claimed in any one of claims 17 to 19, wherein the breakthrough whey proteins are recovered separately, to produce a WPC depleted in GMP or a WPC depleted in glycosylated subfraction of GMP.

22. A process as claimed in claim 1, wherein step (a) comprises contacting the anion exchanger with a whey protein-contacting solution selected from mineral acid whey, lactic acid whey, UF retentate derived from acid whey, or reconstituted WPC derived from acid whey, at a pH of about 5 or below, to selectively adsorb acidic peptides and proteins.

23. A process as claimed in claim 22, wherein the anion exchanger is contacted with the whey protein containing solution at a pH of about 3 to about 5.0.

24. A process as claimed in claim 22 or 23 wherein, the adsorbed proteins are recovered from the anion exchanger, to produce a WPI containing acidic peptides and proteins substantially free of the major whey proteins.

25. A process as claimed in any one of claims 22 to 23, wherein the breakthrough whey proteins are recovered separately, to produce a WPC depleted in acidic peptides and proteins.

26. A process as claimed in claim 1, wherein step (a) comprises contacting the anion exchanger with a whey protein-containing solution selected from whole milk, skim milk or ultrafiltered milk, to adsorb proteins in the milk or milk retentate.

27. A process as claimed in claim 26, wherein the anion exchanger is contacted with the whey protein-containing solution at a pH of from about 6.7.

28. A process as claimed in claim 27, wherein the anion exchanger is contacted with the whey protein-containing solution at a pH of about pH 6.6.

29. A process according to any one of claims 26 to 28, wherein the adsorbed proteins are recovered from the anion exchanger to produce a WPI.

30. A process according to any one of claims 26 to 28, wherein the breakthrough from the anion exchanger is recovered separately, to produce a whey protein reduced milk, skim milk, retentate or milk protein concentrate.

* * * * *

UNITED STATES PATENT AND TRADEMARK OFFICE
CERTIFICATE OF CORRECTION

PATENT NO. : 7,018,665 B2
APPLICATION NO. : 10/149339
DATED : March 28, 2006
INVENTOR(S) : John Stephen Ayers et al.

It is certified that error appears in the above-identified patent and that said Letters Patent is hereby corrected as shown below:

On first page, Col. 1, under "Inventors", please delete "Bijaya" and insert --Vijaya--, therefore.

In Col. 1, line 9, please delete 'PCTINZ00/00245" and insert --PCT/NZ00/00245,--, therefor.

In Col. 3, line 30, please delete "$pH \geqq 4$" and insert --$pH \leqq 4$--, therefor.

In Col. 3, line 42, please delete "α-lactalbuminl" and insert --α-lactalbumin--, therefor.

In Col. 5, line 28, please delete "(exchanger" and insert --exchanger--, therefor.

In Col. 8, line 63, please delete "allylating" and insert --alkylating--, therefor.

In Col. 12, line 59, please delete "mm)" and insert --mM)--, therefor.

In Col. 17, line 22, Claim 1, please delete "containing" and insert --contacting--, therefor.

In Col. 17, line 23, Claim 1, please delete "exchange" and insert --exchanger--, therefor.

In Col. 17, line 24, Claim 1, please delete "a" and insert --or--, therefor.

In Col. 17, line 37, Claim 2, please delete "caution" and insert --solution--, therefor.

In Col. 17, line 42, Claim 3, please delete "a" and insert --of--, therefor.

In Col, 17, line 56, Claim 8, please delete "containing" and insert --contacting--, therefor.

In Col. 18, line 29 (approx.), Claim 17, please delete "reconstitute" and insert --reconstituted--, therefor.

In Col. 18, Line 31 (approx.), Claim 17, please delete "absorb" and insert --adsorb--, therefor.

In Col. 18, line 36, Claim 19, please delete "subtraction" and insert --subfraction--, therefor.

In Col. 18, line 37, Claim 19, after "pH" please insert --of--.

UNITED STATES PATENT AND TRADEMARK OFFICE
CERTIFICATE OF CORRECTION

PATENT NO. : 7,018,665 B2
APPLICATION NO. : 10/149339
DATED : March 28, 2006
INVENTOR(S) : John Stephen Ayers et al.

It is certified that error appears in the above-identified patent and that said Letters Patent is hereby corrected as shown below:

In Col. 18, line 41, Claim 20, please delete "GMP-containing" and insert --GMP-containing,--, therefor.

In Col. 18, line 48, Claim 22, please delete "protein-contacting" and insert --protein-containing--, therefor.

In Col. 19, line 5, Claim 27, please delete "6.7." and insert --6-7--, therefor.

Signed and Sealed this

Twenty-eighth Day of November, 2006

JON W. DUDAS
*Director of the United States Patent and Trademark Office*